(12) United States Patent
Miller et al.

(10) Patent No.: US 9,017,783 B2
(45) Date of Patent: Apr. 28, 2015

(54) HOT MELT ADHESIVE COMPOSITION FOR BONDING WPP SUBSTRATES

(75) Inventors: Richard A. Miller, White Bear Ave., MN (US); Andres I. Sustic, Woodbury, MN (US)

(73) Assignee: H. B. Fuller Company, St. Paul, MN (US)

( * ) Notice: Subject to any disclaimer, the term of this patent is extended or adjusted under 35 U.S.C. 154(b) by 907 days.

(21) Appl. No.: 11/788,688

(22) Filed: Apr. 20, 2007

(65) Prior Publication Data

US 2007/0281118 A1 Dec. 6, 2007

Related U.S. Application Data

(60) Provisional application No. 60/810,376, filed on Jun. 2, 2006.

(51) Int. Cl.
| | | |
|---|---|---|
| *C08K 5/01* | (2006.01) | |
| *C09J 123/14* | (2006.01) | |
| *C08L 51/06* | (2006.01) | |
| *C09J 151/06* | (2006.01) | |
| *C08L 23/14* | (2006.01) | |

(52) U.S. Cl.
CPC ............ *C09J 123/142* (2013.01); *C08L 23/142* (2013.01); *C08L 51/06* (2013.01); *C08L 2205/02* (2013.01); *C09J 151/06* (2013.01)

(58) Field of Classification Search
USPC ............ 524/270, 292, 293; 525/285, 416, 74
See application file for complete search history.

(56) References Cited

U.S. PATENT DOCUMENTS

| | | | |
|---|---|---|---|
| 4,719,260 A | 1/1988 | Stuart, Jr. et al. | |
| 5,441,999 A * | 8/1995 | Jarvis et al. | 524/271 |
| 5,723,546 A * | 3/1998 | Sustic | 525/240 |
| 5,747,573 A * | 5/1998 | Ryan | 524/270 |
| 6,218,457 B1 * | 4/2001 | Fralich et al. | 524/489 |
| 6,312,783 B1 * | 11/2001 | Radwan | 428/97 |
| 7,223,814 B2 * | 5/2007 | Martin et al. | 524/504 |
| 2003/0096896 A1 * | 5/2003 | Wang et al. | 524/425 |
| 2003/0232161 A1 * | 12/2003 | Lin et al. | 428/34.3 |
| 2005/0032963 A1 * | 2/2005 | Harwell et al. | 524/474 |

FOREIGN PATENT DOCUMENTS

| | | |
|---|---|---|
| EP | 1 125 980 | 8/2001 |
| WO | WO 02/36704 | 5/2002 |

* cited by examiner

*Primary Examiner* — Ellen S Wood
(74) *Attorney, Agent, or Firm* — Kirsten Stone; Allison Johnson

(57) ABSTRACT

The invention relates to a hot melt adhesive composition including an amorphous poly-alpha-olefin, an amorphous propylene/butene copolymer, a grafted polyethylene, and a wax. The hot melt adhesive composition can be used for bonding woven polypropylene substrates. The invention also provides an adhesive bonded woven polypropylene bag.

23 Claims, No Drawings

HOT MELT ADHESIVE COMPOSITION FOR BONDING WPP SUBSTRATES

CROSS-REFERENCE TO RELATED APPLICATIONS

This Application claims the benefit of priority to U.S. Provisional Application Ser. No. 60/810,376 filed Jun. 2, 2006.

FIELD OF THE INVENTION

The invention relates to a hot melt adhesive composition. Particularly, the invention relates to a hot melt adhesive composition for bonding woven polypropylene (WPP) substrates.

BACKGROUND OF THE INVENTION

A packaging bag typically includes a seam, a manufacturer end, and a customer end. Bags are manufactured in a variety of ways, which may include sewn open mouth, pasted open mouth, and pinch bottom open mouth. To manufacture a bag e.g., a heavy Kraft paper bag by a method known as pinch bottom open mouth, a sheet or multiple sheets of Kraft paper or film substrate is first fabricated as a tube with an adhesive-sealed seam. Then, an adhesive is applied to the manufacturer end and sealed by the bag manufacturer. The adhesive is also applied to the customer end, which will be heat-sealed by the customer once the products are packaged into the bag. This type of bag is also called a pinch bottom open mouth bag.

Multiwall paper bags have been used for heavy-duty packaging applications such as packaging grain, fertilizer, chemicals, pet food, etc. Although formed from a plurality of paper plies, these paper bags have relatively high tear/wear rate and can be easily torn open and damaged during transportation, especially when the bags are filled with heavy products.

The packaging industry has been evaluating woven polypropylene (WPP) substrates for the manufacture of a variety of end use bags, especially heavy-duty bags. Woven polypropylene bags offer the best packaging for a large variety of products in industries such as agriculture, chemical, mining, building materials, pet food, and construction. Whether simple bags for business-to-business applications or bags with high-quality graphics for superb consumer appreciation, woven polypropylene bags offer economy, better protection, weight savings, and greater strength than other available packaging. Especially over paper bags or jute bags woven polypropylene bags offer lighter weight, greater bursting strength, better pest resistance, resistance to tearing, reusable, properties that do not degrade if wet, and are less expensive.

Currently, woven polypropylene bags are manufactured with a hemmed top (at customer end) and a fold stitched bottom (at manufacturer end), along with single or double sewn seams. The sewn woven polypropylene bags are hard to make and also costly due to the lower production rates and the cost of inline sewing equipment. Efforts have been made to develop a suitable adhesive composition for bonding WPP substrate; but none of the conventional hot melt adhesives, such as, polyamide, ethylene vinyl acetate, or polyethylene based adhesives could provide adequate bonding because the WPP substrate is non-porous and has low surface energy, e.g., a surface energy value of no greater than about 30 dyne. In addition to the above surface bonding difficulty, none of the conventional adhesives could bond adequately to the WPP substrate at a lower temperature e.g., about 0° F. and maintain the bonding ability at a higher temperature, e.g., about 140° F. Further, the WPP substrate tends to have a heat distortion at a temperature higher than about 330° F., which also requires an adhesive suitable for the low temperature application.

Therefore, there is a substantial need for an adhesive composition especially capable of excellent adhesion to a woven polypropylene substrate.

SUMMARY OF THE INVENTION

In one aspect, the invention provides a hot melt adhesive composition including an amorphous poly-alpha-olefin, an amorphous propylene/butene copolymer, a grafted polyethylene, and optionally, a wax.

In one embodiment, the adhesive composition further includes an antioxidant.

In one embodiment, the adhesive composition exhibits a glass transition temperature of no greater than about −25° C.

In one embodiment, the adhesive composition exhibits a peak melting point of about 90° C.±5° C.

In one embodiment, the adhesive composition exhibits a melt viscosity of about 17,000 cps at 325° F.

In another aspect, the invention provides an article including a substrate and any one of the aforesaid hot melt adhesive compositions disposed on at least a portion of a surface of the substrate.

In one embodiment, the article further includes a non-blocking agent disposed on top of the adhesive composition.

In yet another aspect, the invention provides a method of manufacturing an article comprising applying any one of the aforesaid hot melt adhesive compositions to at least a portion of a surface of a substrate.

In yet another aspect, the invention provides a bag that includes a seam, a manufacturer end, a customer end, and any one of the aforesaid hot melt adhesive compositions. The seam and the manufacturer end are sealed with the hot melt adhesive composition.

In one embodiment, the customer end includes a layer of any one of the aforesaid hot melt adhesive compositions.

In one embodiment, the customer end includes a layer of a non-blocking agent disposed on the surface of any one of the aforesaid hot melt adhesive compositions.

In one embodiment, the non-blocking agent is maleated polypropylene.

In one embodiment, the bag is a woven polypropylene bag.

In yet another aspect, the invention provides a method of making the bag of the invention. The method includes applying any one of the aforesaid hot melt adhesive compositions of the invention to one edge of a sheet of a substrate, and bringing the opposite edge into contact with the adhesive to form a tube. The tube includes an adhesive-sealed seam, a manufacturer end, and a customer end.

In one embodiment, the substrate includes multiple sheets (or multiple plies).

In one embodiment, the substrate is woven polypropylene.

In one embodiment, the method further includes applying any one of the aforesaid hot melt adhesive compositions of the invention to the manufacturer end, and sealing the manufacturer end.

In one embodiment, the method further includes applying any one of the aforesaid hot melt adhesive compositions of the invention to the customer end, which will be sealed by the customer once the intended product is packaged in the bag.

In one embodiment, the method further includes applying a non-blocking agent to the surface of the adhesive composition disposed on the customer end.

In one embodiment, the non-blocking agent is a maleated polypropylene dispersion.

In one embodiment, the method is to make woven polypropylene bag.

The hot melt adhesive composition of the invention can be formulated to provide very good adhesion to woven polypropylene substrates at a temperature, e.g., from about 0° F. to about 140° F.

The hot melt adhesive composition of the invention exhibits a peel adhesion failure temperature (PAFT) of no less than about 140° F.

The hot melt adhesive composition of the invention exhibits a shear adhesion failure temperature (SAFT) of no less than about 140° F.

The hot melt adhesive composition of the invention can be formulated to provide good machineability on the conventional bag adhesive equipment.

The hot melt adhesive composition can also be formulated for low temperature application, e.g., at a temperature of from about 290° F. to about 350° F.

The hot melt adhesive composition of the invention is useful for bonding various substrates, especially low surface energy substrates, e.g., the substrates that have a surface energy of no greater than about 30 dyne.

In one embodiment, the substrate is a non-porous woven polypropylene substrate that is treated e.g., by corona, flame, or plasma to have a relatively high surface energy. In another embodiment, the substrate is a non-porous woven polypropylene substrate that is not treated, therefore, has a low surface energy.

Other features of the invention will be apparent from the following description of the invention and preferred embodiments thereof, and from the claims.

DETAILED DESCRIPTION OF THE INVENTION

The hot melt adhesive composition of the invention includes an amorphous poly-alpha-olefin, an amorphous propylene/butene copolymer, a grafted polyethylene, and optionally, a wax, and/or an antioxidant.

Examples of useful amorphous poly-alpha-olefins include terpolymers of propylene-ethylene-butene. The terpolymers may contain either high butene content or high propylene content. The weight average molecular weight of the terpolymers may vary from about 60,000 to about 200,000. In some embodiments, the terpolymers have high propylene content and the weight average molecular weight of from about 60,000 to about 120,000. In one embodiment, the terpolymer has a propylene content of no less than about 60 wt %. Examples of commercially available terpolymers include Vestoplast® 828 from Degussa AG (Marl, Germany), which has a weight average molecular weight of approximately 61,000 and a melt viscosity of 28,000 cps at 190° C., a ring and ball softening point of 155° C. (as measured by H.B. Fuller Company according to the test method DIN 52011) and of 157-165° C. (as shown in Evonik Degussa data sheet), and an "intrinsic viscosity" (100 ml/g) of 0.70. Other information regarding the amorphous poly-alpha-olefins can be found, e.g., in U.S. Pat. No. 5,747,573, which is incorporated here by reference in its entity.

The amorphous poly-alpha-olefin may be present in the adhesive composition in an amount of from about 35% by weight, or about 40% by weight, or up to about 50% by weight, or even up to about 55% by weight, based on the total weight of the composition.

Examples of useful amorphous propylene/butene copolymers include Rextac™ 2730, which is an copolymer of propylene and butene having about 65 wt % propylene and about 35 wt % butene, produced by Huntsman Company (Odesa, Tex.). Rextac™ 2730 also has a melting point of 85° C. with a melting range from 25° C. to 116° C., a Tg of −25° C., a crystallinity of about 7%, an enthalpy of about 2 J/g by DSC, a number average molecular weight (Mn) of 11,000, a weight average molecular weight (Mw) of 65,000, a Z-average molecular weight (Mz) of 327,000 by GPC, and a ratio of Mw/Mn of 6.2.

The amorphous propylene/butene copolymer may be present in the adhesive composition in an amount of from about 25% by weight, or about 30% by weight, or up to about 40% by weight, or even up to about 45% by weight, based on the total weight of the composition.

Grafted polyethylenes also refer to polyethylene graft copolymer. Examples of useful grafted polyethylenes include polyethylene graft copolymers having an acid number of from about 1 to about 60 and are grafted with an unsaturated polycarboxylic acid or anhydride, such as maleic acid, acrylic acid, or maleic anhydride. Examples of commercially available grafted polyethylenes include Epolene C-18 from Eastman Chemical Company (Longview, Tex.), which is a polyethylene graft copolymer having an acid number of about 2 and is grafted with maleic anhydride.

The amount of the graft polyethylene present in the composition may be from about 15% by weight to about 25% by weight, based on the total weight of the composition.

The adhesive composition may optionally include a wax. Examples of useful waxes include those that have a melting point of no less than about 190° F., such as Fischer-Tropsch waxes and microcrystalline waxes e.g., Microwax 195 available from Bentley Chemplax (Australia).

The amount of the wax present in the composition may be up to about 7% by weight, or from about 1% by weight to about 7% by weight, based on the total weight of the composition.

Examples of antioxidants include hindered phenolics e.g., Irganox 1010 from Ciba Specialty Chemicals (Basel, Switzerland), which is 2,2-bis-3-3,5-bis(1,1-dimethylethyl)-4-hydroxyphenyl-1-oxoproxymethyl-1,3-propane-diyl ester of 3,5-bis(1,1-dimethylethyl)-4-hydroxybenzene propanoic acid. The antioxidant may be present in the adhesive composition in an amount of from about 0.1% by weight to about 1.5% by weight, based on the total weight of the composition.

The hot melt adhesive composition of the invention may include other optional components such as additives typically used in adhesive compositions, e.g., resins, fillers, diluents, pigments, etc., and the combinations thereof.

The hot melt adhesive composition of the invention may be prepared by any conventional technique using equipment typical for making hot melt adhesives.

The adhesive composition may be applied to various substrates including, e.g., corona-treated woven polypropylene (treated WPP), untreated woven polypropylene (untreated WPP), Kraft paper, polyolefin films e.g., polyethylene, polyethylene terephthalate (PET), etc.

The hot melt adhesive composition of the invention is formulated to be suitable for low temperature applications, such as at a temperature of from about 290° F. to about 350° F., or at a temperature of no greater than about 330° F. It can be applied to a substrate using a variety of methods including, e.g., slot die coating or spray nozzle. A typical application coating weight can be, on the average, about 4 grams per 17" bag width (gram weight per bottom seal).

In another aspect, the invention relates to a bag that includes a hot melt adhesive composition of the invention, a seam, a manufacturer end, and a customer end. The seam and the manufacturer end are sealed with the hot melt adhesive composition of the invention. In one embodiment, the bag further includes the hot melt adhesive composition of the invention disposed on the customer end, which can be sealed by a customer once the bag is filled with the intended product. In one embodiment, the bag further includes a layer of a non-block agent disposed on the surface of the adhesive composition that has been disposed on the customer end. Examples of useful non-block agents include polymers or waxes, such as, ethylene vinyl acetate, polyvinyl acetate, maleated polypropylene, or polyethylene. The non-blocking agents may be in the form of a water-based dispersion, or a hot melt. In one embodiment, the non-blocking agent is maleated polypropylene. In one embodiment, the maleated polypropylene is a water-based dispersion. In one embodiment, the bag is a woven polypropylene bag.

In yet another aspect, the invention relates to a method of making the bag of the invention. The method includes applying the adhesive composition of the invention to one edge of a sheet (or multiple sheets) of a substrate, and bringing the opposite edge into contact with the adhesive to form a tube that includes an adhesive-sealed seam, a manufacturer end, and a customer end. In one embodiment, the substrate is woven polypropylene. In one embodiment, the method further includes applying the adhesive composition of the invention to the manufacturer end, and sealing the manufacturer end. In one embodiment, the method further includes applying the adhesive composition of the invention to the customer end. In one embodiment, the method further includes applying a non-blocking agent to the surface of the adhesive composition that has been disposed on the customer end. In one embodiment, the non-blocking agent is maleated polypropylene. In one embodiment, the method is to make a woven polypropylene bag.

The invention will be described further by way of the following examples. All parts, ratios, percents and amounts stated in the Examples are by weight unless otherwise specified.

EXAMPLES

Test Procedures

Test procedures used in the examples include the following.

Peel Adhesion Failure Temperature (PAFT)

The peel adhesion failure temperature ("PAFT") is the temperature at which the adhesive bond of the sample fails. Peel adhesion failure temperature of a hot melt adhesive composition is tested according to the standard PAFT test in ASTM D-4498, except that the thickness of the test piece sandwich is 10 mils, the oven temperature is increased automatically at a temperature increase of 25° C./hr rather than manually, and a 100 gram weight is used.

Shear Adhesion Failure Temperature (SAFT)

The shear adhesion failure temperature ("SAFT") is the temperature at which the adhesive bond of the sample fails. Shear adhesion failure temperature of a hot melt adhesive composition is tested according to the standard SAFT test in ASTM D-4498, except that the thickness of the test piece sandwich is 10 mils, the oven temperature is increased automatically at a temperature increase of 25° C./hr rather than manually, and a 500 gram weight is used.

Brookfield Thermocel Melt Viscosity

Thermocel melt viscosity is tested at 10 RPM and an intended temperature (° F.) using a Brookfield viscometer.

T-peel Bond Strength

T-peel bond strength of a hot melt adhesive composition is tested according to the following procedure.

A sample is prepared by placing a 1×5 inch adhesive film with 5-mil thickness in between two 1×6 inch woven polypropylene substrates. The sample is then heat sealed at 325° F. for 4 seconds at 25 psi compression. Thereafter, the sample is conditioned at 77° F. for 24 hours, and then pulled in a temperature chambered Instron tester at 2 inch/min. Reporting the average value of four test samples per test at each temperature condition.

Example 1

A hot melt adhesive composition is prepared by combining 44.5% Vestoplast® 828 (amorphous poly-alpha-olefin), 34.8% Rextac™ 2730 (amorphous propylene-buene copolymer), 17.9% Epolene C-18 (grafted polyethylene), 2.4% Microwax 195 (wax) and 0.4% Irganox 1010 (antioxidant) in a hot melt ribbon mixer at 375° F.

Upon various testing, the adhesive composition exhibits a Brookfield Thermocel melt viscosity of 26,000 cps at 300° F., 16,950 cps at 325° F., 11,520 cps at 350° F., and 8,627 cps at 375° F. The adhesive composition also exhibits a DSC Tg of −30° C., a DSC Tm with a dual endotherm of from 58.41° C. to 85.94° C. Dynamic mechanical analysis indicates a crossover point at 94° C., a PAFT of 146° F., and a SAFT of 185° F.

The adhesive composition is also tested under T-peel Bond Strength test method. The results are reported in the following Table:

TABLE

| Temperature (° F.) | Mean value (lbf) | Maximum value (lbf) |
|---|---|---|
| 0 | .92 | 2.30 |
| 20 | 4.32 | 9.37 |
| 77 | 2.05 | 3.07 |
| 100 | 0.65 | 0.84 |
| 140 | 0.17 | 0.23 |

While numerous embodiments and examples have been disclosed herein, it should be apparent that modifications could be made without departing from the spirit and scope of the invention. Therefore, the appended claims are intended to cover all such modifications that are within the scope of this invention.

We claim:

1. A hot melt adhesive composition comprising:
   an amorphous poly-alpha-olefin terpolymer of propylene-ethylene-butene having a ring and ball softening point of from about 155° C. to about 165° C.,
   an amorphous propylene/butene copolymer in an amount of from about 25% by weight to about 45% by weight based on the weight of the composition,
   a grafted polyethylene, and
   optionally, a wax.

2. The hot melt adhesive composition of claim 1, wherein said adhesive has a glass transition temperature of no greater than about −25° C.

3. The hot melt adhesive composition of claim 1, further comprising an antioxidant.

4. The hot melt adhesive composition of claim 1, wherein said amorphous poly-alpha-olefin terpolymer has propylene content of no less than about 60%, based on the total terpolymer.

5. The hot melt adhesive composition of claim 1, wherein said amorphous poly-alpha-olefin terpolymer has a ring and ball softening point of from about 157° C. to about 165° C.

6. The hot melt adhesive composition of claim 1, wherein said-amorphous poly-alpha-olefin terpolymer is in an amount of from about 35% by weight to about 55% by weight, based on the weight of the composition.

7. The hot melt adhesive composition of claim 1, wherein said grafted polyethylene is grafted with maleic acid, or maleic anhydride, or acrylic acid.

8. An article comprising:
a woven polypropylene substrate, and
a hot melt adhesive composition of claim 1 disposed on at least a portion of said substrate.

9. The article of claim 8, further comprising a non-blocking agent disposed on top of said hot melt adhesive composition.

10. The article of claim 8, wherein said substrate is an untreated woven polypropylene.

11. A woven polypropylene bag comprising the hot melt adhesive composition of claim 1, a seam, a manufacturer end, and a customer end, said seam and said manufacturer end being sealed with said hot melt adhesive composition.

12. The bag of claim 11, further comprising a hot melt adhesive composition of claim 1 disposed on said customer end.

13. The bag of claim 11 further comprising a layer of a non-blocking agent disposed on said hot melt adhesive composition.

14. The bag of claim 13, wherein said non-blocking agent is maleated polypropylene.

15. The hot melt adhesive composition of claim 1, wherein said substrates have a surface energy of no greater than about 30 dyne.

16. A method of making the article of claim 8 comprising applying said hot melt adhesive to at least a portion of said substrate at a temperature of from about 290° F. to about 350° F.

17. A method of manufacturing a bag, comprising:
applying an adhesive composition of claim 1 to one edge of a sheet or multiple sheets of a woven polypropylene substrate, and
bringing the opposite edge in contact with said adhesive to form a tube,
said tube including an adhesive sealed seam, a manufacturer end, and a customer end.

18. The method of claim 17, further comprising applying said adhesive composition onto said manufacturer end, and sealing said manufacturer end.

19. The method of claim 17, further comprising applying said adhesive composition onto said customer end.

20. The method of claim 19, further comprising applying a non-blocking agent onto the surface of said adhesive composition.

21. The method of claim 20, wherein said non-blocking agent is maleated polypropylene.

22. A hot melt adhesive composition comprising:
from about 25% by weight to about 45% by weight of an amorphous propylene/butene copolymer,
from about 35% by weight to about 55% by weight of an amorphous poly-alpha-olefin other than the amorphous propylene/butene copolymer,
a grafted polyethylene, and
from about 1% by weight to about 7% by weight of a wax.

23. The hot melt adhesive composition of claim 22, wherein said amorphous poly-alpha-olefin is a terpolymer of propylene-ethylene-butene.

* * * * *